(12) United States Patent
Schnaithmann

(10) Patent No.: US 7,952,632 B2
(45) Date of Patent: *May 31, 2011

(54) IMAGE RECORDING DEVICE AND METHOD

(75) Inventor: Martin Schnaithmann, Esslingen-Berkheim (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,023

(22) Filed: Dec. 14, 2009

(65) Prior Publication Data

US 2010/0091137 A1    Apr. 15, 2010

Related U.S. Application Data

(63) Continuation of application No. 11/581,687, filed on Oct. 16, 2006, now Pat. No. 7,636,117, which is a continuation of application No. PCT/EP2005/003695, filed on Apr. 8, 2005.

(30) Foreign Application Priority Data

Apr. 26, 2004   (DE) .......................... 10 2004 020 331

(51) Int. Cl.
*H04N 5/335*  (2011.01)

(52) U.S. Cl. ........ 348/294; 348/231.3; 348/82; 348/143

(58) Field of Classification Search ................... 348/294, 348/231.3, 82, 143
See application file for complete search history.

(56) References Cited

U.S. PATENT DOCUMENTS

| | | |
|---|---|---|
| 5,107,103 A | 4/1992 | Gruss et al. |
| 5,392,070 A | 2/1995 | Endo et al. |
| 6,118,482 A | 9/2000 | Clark et al. |
| 6,396,539 B1 | 5/2002 | Heller et al. |
| 6,477,318 B2 | 11/2002 | Ishii |
| 6,489,798 B1 | 12/2002 | Scott-Thomas et al. |
| 6,633,335 B1 | 10/2003 | Kwon et al. |
| 6,697,568 B1 | 2/2004 | Kaku |
| 2003/0030723 A1 | 2/2003 | Dottling et al. |
| 2003/0140212 A1 | 7/2003 | Stein et al. |
| 2004/0026508 A1 | 2/2004 | Nakajima et al. |
| 2004/0239770 A1 | 12/2004 | Misawa |

(Continued)

FOREIGN PATENT DOCUMENTS

EP    0 428 626 B1    5/1991

(Continued)

OTHER PUBLICATIONS

Xiaomang Zhang et al.; "An Approach To Detect Defective CCD In Digital Cameras"; 1999; pp. 553-558.

(Continued)

*Primary Examiner* — David L Ometz
*Assistant Examiner* — Quang V Le
(74) *Attorney, Agent, or Firm* — Harness, Dickey & Pierce, P.L.C.

(57) ABSTRACT

A camera device for recording an image comprises an image sensor having a plurality of light-sensitive image cells. The image cells can be selectively addressed in order to read their image signal values. The device also has a plurality of memory cells for storing identification codes, with an identification code being assigned to each image cell. The image cells and the memory cells are coupled to one another such that, when an image signal value is read from an image cell, the assigned identification code can also be read.

21 Claims, 2 Drawing Sheets

U.S. PATENT DOCUMENTS

2004/0252874 A1    12/2004    Yamazaki

FOREIGN PATENT DOCUMENTS

| | | |
|---|---|---|
| EP | 1 487 193 A1 | 12/2004 |
| JP | 60-182277 A | 9/1985 |
| JP | 63-248289 A | 10/1988 |
| JP | 2000-059700 A | 2/2000 |
| JP | 2000-77637 | 3/2000 |
| JP | 2003-259220 | 9/2003 |
| JP | 2003-530791 | 10/2003 |
| JP | 2005-6196 | 1/2005 |
| WO | WO 01/78411 | 10/2001 |
| WO | WO 03/067900 | 8/2003 |

OTHER PUBLICATIONS

Dirk M. Ebert et al.; "Safe Human-Robot-Cooperation: Image-based collision detection for Industrial Robots"; 2002; pp. 1826-1831.

IMAGE RECORDING DEVICE AND METHOD

CROSS REFERENCES TO RELATED APPLICATIONS

This application is a continuation of U.S. Ser. No. 11/581,687, filed Oct. 16, 2006, now U.S. Pat. No. 7,636,117 B2, which is a continuation of international patent application PCT/EP2005/003695 filed on Apr. 8, 2005 designating the U.S. and published in German language on Nov. 3, 2005, which international application claims priority from German patent application DE 10 2004 020 331.8 filed on Apr. 26, 2004. The entire contents of these priority applications are incorporated by reference herewith.

BACKGROUND OF THE INVENTION

The present invention relates to a camera device for recording an image, and more particularly to a camera device for safeguarding a hazardous area of an automatically operated installation. Moreover, the invention relates to an image sensor for such a device and to a method for recording an image with an image sensor.

WO 01/78411 A1 discloses a protective device for safeguarding a hazardous area, such as the hazardous area of an automatically operated installation. The protective device is based on the idea of recording an image of the hazardous area using a camera, and to be more precise using an image sensor. The recorded image is then subjected to evaluation in order to establish whether an unauthorized object is located in the hazardous area. If this is the case then the protective device initiates a suitable action. By way of example, the protective device brings the monitored installation into a safe state by turning it off or by controlling it into a safe rest position. The protective device of WO 01/78411 A1 therefore fulfills tasks for which, to date, light barriers, light curtains, protective fences and the like typically have been used.

The camera based protective device therefore fulfills safety-critical tasks. It is thus necessary to ensure that the protective device operates in a functional reliable and fail-safe manner to a degree which reliably rules out any risk to people as a result of faults in the operation of the protective device. The novel protective device therefore needs to have a single-fault safety and needs to meet at least the requirements of category 3 of European standard EN 954-1 or comparable safety requirements. Preferably, the requirements of category 4 of EN 954-1 or comparable requirements should be met. This requires regular function tests on the device in the course of operation.

For safeguarding the hazardous area in a reliable and continuous manner, the aforementioned WO 01/78411 A1 proposes to selectively make dynamic an object image recorded by the image sensor. Evaluation of the changes which are thus brought about artificially in the object image allows the functional reliability of the image sensor to be monitored. This allows early detection of what are known as stuck-at faults, for example, where single or a plurality of image cells in the image sensor provide a constant image signal value regardless of the incident light.

However, selectively changing the object image requires components which influence the path of rays in the incident light on the image sensor. This makes the known device rather complex and expensive.

As an alternative, WO 03/067900 A1 proposes a method for checking the functional reliability of an image sensor based on statistical analysis of the image signal values from the image sensor. This involves evaluating the noise response in the image signal values from the image sensor. Changes in the noise response allow conclusions to be drawn about possible faults in the operation of the image sensor.

SUMMARY OF THE INVENTION

It is an object of the present invention to provide another approach for reliably detecting faults in the operation of a device as mentioned at the outset during the course of operation. In particular, it is an object to provide a camera-based method and device for safeguarding a hazardous area of an automatically operated installation, wherein the functional faults of the image sensor can be detected and handled in an inexpensive and reliable manner.

According to one aspect of the invention, there is provided a camera device for recording an image, comprising an image sensor having a plurality of light-sensitive image cells for generating light-dependant image signal values, the image cells being adapted to be selectively addressed in order to read the image signal values, further comprising a plurality of memory cells for storing identification codes, with each image cell having assigned an identification code, and with the image cells and the memory cells being coupled to one another such that, when an image signal value is read from an image cell, the assigned identification code can also be read.

According to another aspect, there is provided an image sensor for recording an image, comprising a plurality of light-sensitive image cells for generating light-dependant image signal values, the image cells being adapted to be selectively addressed in order to read the image signal values, and comprising a plurality of memory cells for storing identification codes, with each image cell having assigned an identification code, and with the image cells and the memory cells being coupled to one another such that, when an image signal value is read from an image cell, the assigned identification code can also be read According to yet another aspect, there is provided a method for recording an image with an image sensor having a plurality of light-sensitive image cells for generating light-dependant image signal values, wherein the image cells can be selectively addressed in order to read the image signal values, comprising the steps of: a) providing identification codes in memory cells which are coupled to the image cells, with each image cell having assigned an identification code, b) reading the image signal values from at least one image cell, c) reading the identification code assigned to the at least one image cell, d) checking whether the read identification code matches the identification code assigned to the at least one image cell, and e) exploiting the image signal values read from the at least one image cell depending on the result of step d).

The new method and device are therefore based on the idea of implementing an additional protective mechanism which can be used to ensure that the image signal value which is read from an image cell actually comes from the addressed image cell. This allows to reliably detect addressing faults and other faults in the operation of the control circuit of the image sensor at the level of the image cells. Although such faults can basically be detected by selectively making dynamic an object image or an externally supplied test image, the present approach has the advantage that it allows continuous fault monitoring during the course of the monitoring operation with little hardware complexity. The present invention is therefore an inexpensive alternative to the fault monitoring measures which have been known to date. However, it can also be used in addition to the fault monitoring measures which have been known to date, in order to ensure the functional reliability of an appropriate protective device even more reliably.

In a preferred refinement of the invention, an addressing unit is configured to jointly address memory cells and image cells assigned to one another for reading.

In this refinement, the image cells and their assigned memory cells are coupled to one another by means of the addressing unit. The addressing unit allows the image cells and the assigned memory cells to be read in one operating cycle, i.e. largely simultaneously. This achieves very simple and direct coupling between the image cells and assigned memory cells. Addressing faults can be detected very quickly and reliably.

In a particularly preferred refinement, the memory cells are integrated into the image sensor.

In this refinement, the memory cells are on the same chip as the light-sensitive image cells. First, this refinement allows a very compact implementation. In addition, the assignment between memory cells and light-sensitive image cells can be implemented on the chip in this refinement, which results in an even more direct and more reliable assignment. Furthermore, the memory cells in this refinement can be integrated into the novel protective device rather inexpensively.

In a further refinement, the memory cells are implemented substantially in the form of image cells which are occupied by a light-independent signal value.

This refinement is a particularly simple and inexpensive way of integrating the memory cells into the image sensor. The memory cells are thus formed using the same manufacturing processes and at least largely the same method steps as the light-sensitive image cells. Differences in detail between the image cells and the memory cells of course might occur due to their different functions. By way of example, the memory cells, unlike the light-sensitive image cells, do not require a light-sensitive (photoelectric) area, even though one may nevertheless be provided for reasons of process economics. On the other hand, there has to be a possibility to specifically "load" the memory cells with a defined signal value, unlike the light-sensitive image cells, which can result in differences in circuit design between the memory cells and the image cells depending on the image sensor used. However, the refinement preferred here has the advantage that the memory cells can be addressed and read in exactly the same way as the light-sensitive image cells in the image sensor. This allows a particularly simple and reliable detection of faults during operation. In addition, other sources of fault, such as couplings between several image cells, can be easily and reliably identified in this refinement of the invention. These couplings are to be understood as faults which cause the image signal values from one or more image cells to be dependent on the image signal values from other image cells. The fact that the memory cells in this refinement of the invention are implemented like image cells means that such sources of fault also affect the memory cells, and they can be reliably identified on the basis of the known identification codes.

In another refinement, the image cells are arranged in a plurality of rows, and each row has assigned an identification code.

In this refinement, not every single image cell has its "own" identification code. Rather, the image cells in each row of the image sensor have assigned a common identification code. This refinement simplifies the practical implementation both in terms of hardware and in the evaluation, since image sensors are frequently read in rows.

In another refinement, the image cells are arranged in a plurality of rows, and each row comprises a plurality of memory cells.

This refinement is particularly advantageous if the memory cells are implemented like image cells, since the identification codes are then automatically "delivered at the same time" when the image cells are read. Independently of this, it would alternatively also be possible to provide just a single memory cell for each row of the image sensor. Different identification codes could then be encoded using different voltage levels, that is to say in analog form, for example. The preferred refinement simplifies evaluation, since a plurality of rows can be encoded digitally and the image signal values from modern image sensors are usually processed digitally.

In another refinement, the image cells on the image sensor form a common image cell area, and the memory cells form a memory cell area. Preferably, the memory cell area adjoins the image cell area on at least one side.

The physical separation of memory cells and image cells into distinct areas allows the image sensor to be manufactured easily and less expensively. In addition, "complete" images can be achieved in a high resolution on account of this refinement.

Alternatively, the memory cells are interposed between the image cells forming the image cell area. This facilitates a double use of the memory cells as image cells.

In another refinement, the image cells are arranged in a plurality of columns, and each column has assigned an identification code.

This refinement is particularly advantageous if each row of the image sensor also has assigned memory cells with an identification code. In this case, an individual identification code can very easily and inexpensively be allocated to each image cell. Faults in operation can therefore be detected individually at the level of the image cells. On the other hand, encoding in columns can replace the encoding in rows with the advantages mentioned above.

In another refinement, there is a control unit which is connected to the memory cells and which is designed to change, in particular to negate, identification codes stored in the memory cells in a cyclical or non-cyclical manner. In a particularly preferred embodiment, the identification codes are changed each time the image signal values are read, i.e. after each image (frame).

In this refinement, the identification codes have a defined dynamic behavior which allows to easily detect further sources of fault, such as stuck-at faults and coupling between image cells. In addition, it is a very simple matter to identify, without external aids, whether the image sensor is providing a continually updated live image or whether the same image data are always read. The fault monitoring is therefore particularly meaningful.

In another refinement, the identification codes are stored as error detecting codes in the memory cells. In preferred exemplary embodiments, the identification codes are protected using a CRC checksum and/or use is made of a Hamming code, a what is known as walking code or a 2-out-of-5 code. The latter codes have the property that a plurality of bits respectively change from one code word to the next, which means that faults can be identified more easily and with a greater level of reliability when adjacent identification codes are read.

It goes without saying that the features mentioned above and those yet to be explained below can be used not only in the respectively indicated combination but also in other combinations or on their own, without departing from the scope of the present invention.

BRIEF DESCRIPTION OF THE DRAWINGS

Exemplary embodiments of the invention are illustrated in the drawing and are explained in more detail in the description below. In the drawing.

DESCRIPTION OF PREFERRED EMBODIMENTS

Figure 1:
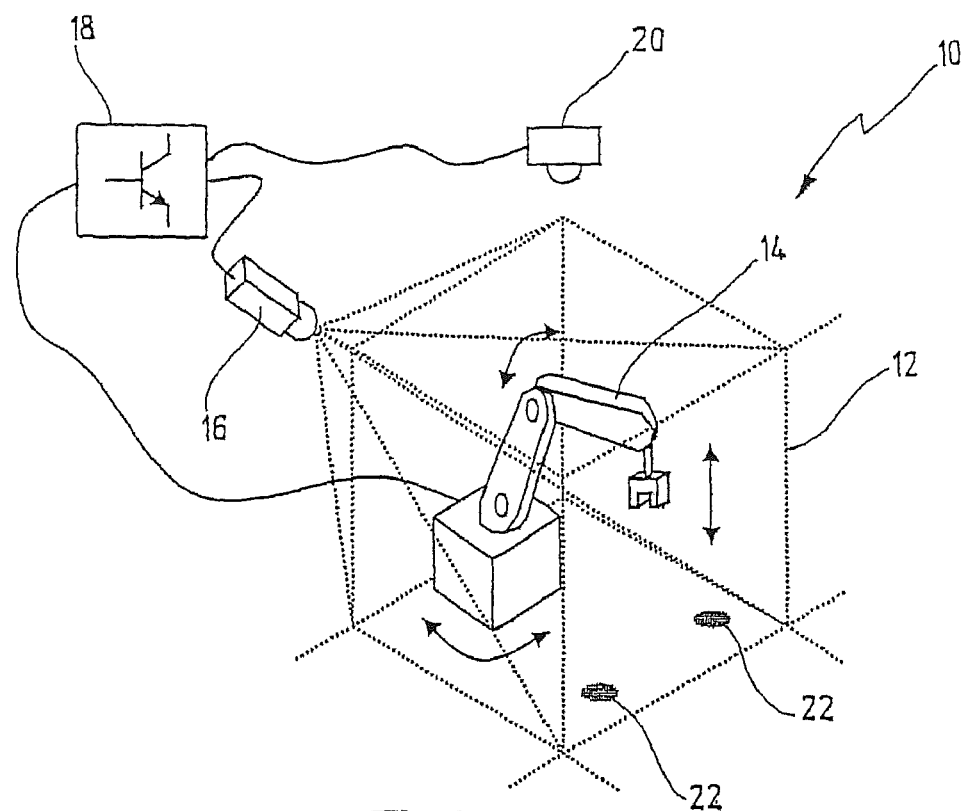
FIG. 1 shows a schematic illustration of an inventive device for safeguarding the hazardous area in an automatically operated installation.

In FIG. 1, an embodiment of the novel device is denoted in its entirety by reference numeral 10.

Device 10 is used here for safeguarding a hazardous area 12 which arises on account of the automated movements (indicated by arrows) of a robot 14. As soon as a person (not shown here) enters the hazardous area 12, the robot 14 must be put into a safe position of rest. This is done using the novel device 10. For the sake of completeness, it should be pointed out that the invention can be used not only for safeguarding robots but also for safeguarding any other hazardous areas which arise particularly as a result of automatic movements of technical installations. In addition, the invention can also be used for any other applications in which a 3D area is visually monitored using an image sensor.

The device 10 comprises an image recording unit 16 and an evaluation and control unit 18. Reference numeral 20 denotes a light source which is actuated by the evaluation and control unit 18 in order to illuminate the robot 14 and its hazardous area 12. The light source 20 can also be dispensed with if the basic brightness in the area of the robot 14 is sufficient to carry out image evaluation with the required reliability of identification.

Reference numeral 22 denotes two reference objects arranged in the hazardous area 12. The reference objects 22 each have a defined position and a defined contrast, which allows further function checks on the device 10. By way of example, the reference objects 22 can be used to monitor that the image recording unit 16 is at the prescribed position and is not so heavily soiled that reliable monitoring of the hazardous area 12 is at risk.

The image recording unit 16 is actuated by the evaluation and control unit 18, this also including other function tests, inter alia. In addition, the evaluation and control unit 18 performs the image evaluation and brings the robot 14 to the safe position of rest, if appropriate. As an alternative to the separate illustration of the image recording unit 16 and the evaluation and control unit 18 in FIG. 1, said two units may also be combined. Furthermore, the evaluation and control unit 18 could be integrated in an operational controller (not shown here) for the robot 14.

Figure 2:
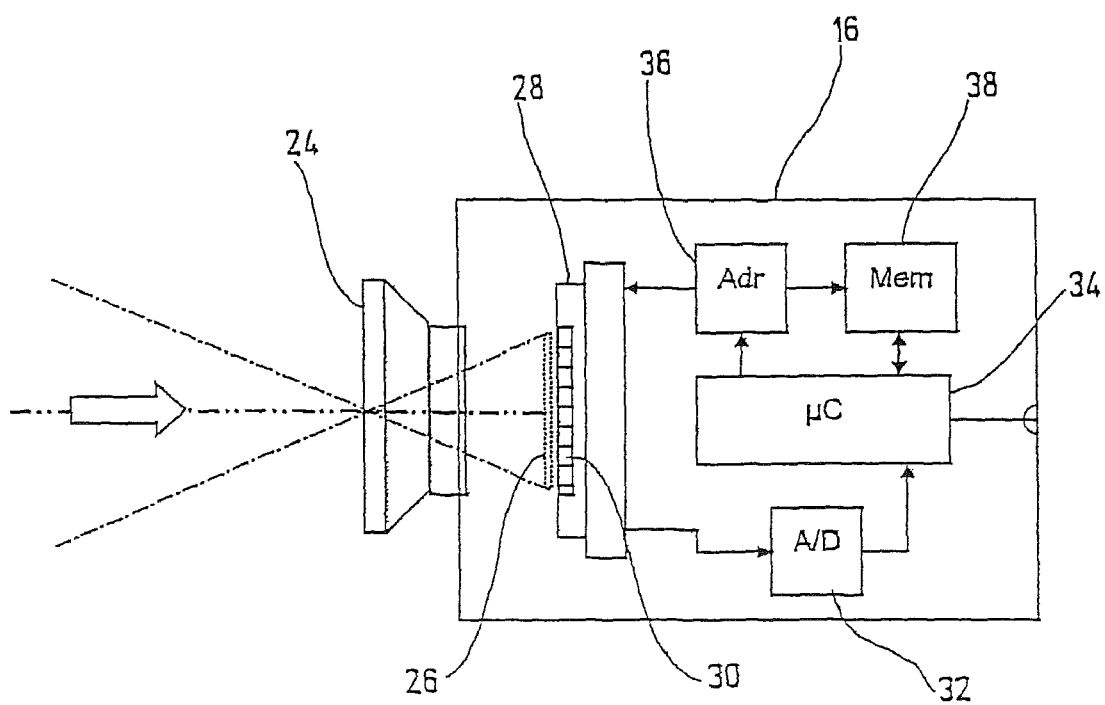
FIG. 2 shows a simplified illustration of an image recording unit for the device of FIG. 1.

As FIG. 2 shows, the image recording unit 16 comprises a lens 24 which is used to map the image 26 of the hazardous area 12 onto an image sensor 28. The image sensor 28 has a plurality of image cells 30, which are often called pixels. Preferably, this is an image sensor using CMOS technology, although the invention is not limited to this. The image cells are selectively addressable, particularly in rows, in columns, in blocks or else individually as in the case of a RAM. The invention is not limited to image sensors whose image cells can be read individually, however. The "selectively address-able" property therefore also includes image sensors in which the image cells can be read only in groups, such as in rows or in columns, for example.

Reference numeral 32 denotes an A/D converter which converts the analog image signal values from the image cells 30 into digital image signal values. The digital image signal values are then supplied to a microcontroller 34. Instead of a microcontroller, it is also possible to use an FPGA (Field Programmable Logic Array) or another signal processing circuit here. Depending on performance, the microcontroller 34 can also perform part of the image evaluation or can even be the evaluation and control unit 18 (FIG. 1). In preferred exemplary embodiments, the microcontroller 34 is implemented with two-channel redundancy (not shown here), the redundant parts monitoring one another in order to ensure a high level of fail-safety in this area too.

Reference numeral 36 denotes an addressing unit which produces the address signals required for reading the individual image cells 30. In contrast to the illustration in FIG. 2, the addressing unit 36 may also be implemented on the same chip as the image sensor 28. In one exemplary embodiment of the invention, the addressing unit 36 produces two control signals, which are known as Line enable and Frame enable. These control signals are used to activate the row-by-row reading of the image signal values from the image cells 30. In addition, the addressing unit 36 produces a clock signal (not shown here) in a manner which is known per se, said clock signal synchronizing the row-by-row reading of the individual image signal values.

Reference numeral 38 denotes a memory which comprises a plurality of memory cells (not shown here). The memory cells store identification codes (not shown here) which are assigned with the individual image cells 30 in the image sensor 28. The memory 38 is actuated by the addressing unit 36, specifically in parallel with the image sensor 28. It delivers the identification codes assigned to the image cells 30 synchronously with the respective image signal values to the microcontroller 34.

The schematic illustration in FIG. 2 shows one possible embodiment in which the memory 38 with the identification codes is implemented separately from the image sensor 28. Contrary to this, however, it is currently preferred to integrate the memory 38 into the image sensor 28, as explained below with reference to FIG. 3. By contrast, the design shown in FIG. 2 has the advantage that the image sensor 28 does not need to be modified, i.e. it is possible to use conventional image sensors 28 when the image sensor 28 and the memory 38 are arranged separately.

Regardless of the practical implementation, however, it is preferred if the content of the memory 38, i.e. the identification codes, can be changed by the microcontroller 34 or another suitable control unit. In one particularly preferred embodiment, the microcontroller 34 negates the identification codes assigned to the individual image cells 30 after each new image has been read. This is shown in FIG. 2 by means of a double-headed arrow between the microcontroller 34 and the memory 38. In simpler embodiments, the identification codes are, by contrast, firmly prescribed and cannot be changed during operation of the image recording unit 16.

Figure 3:
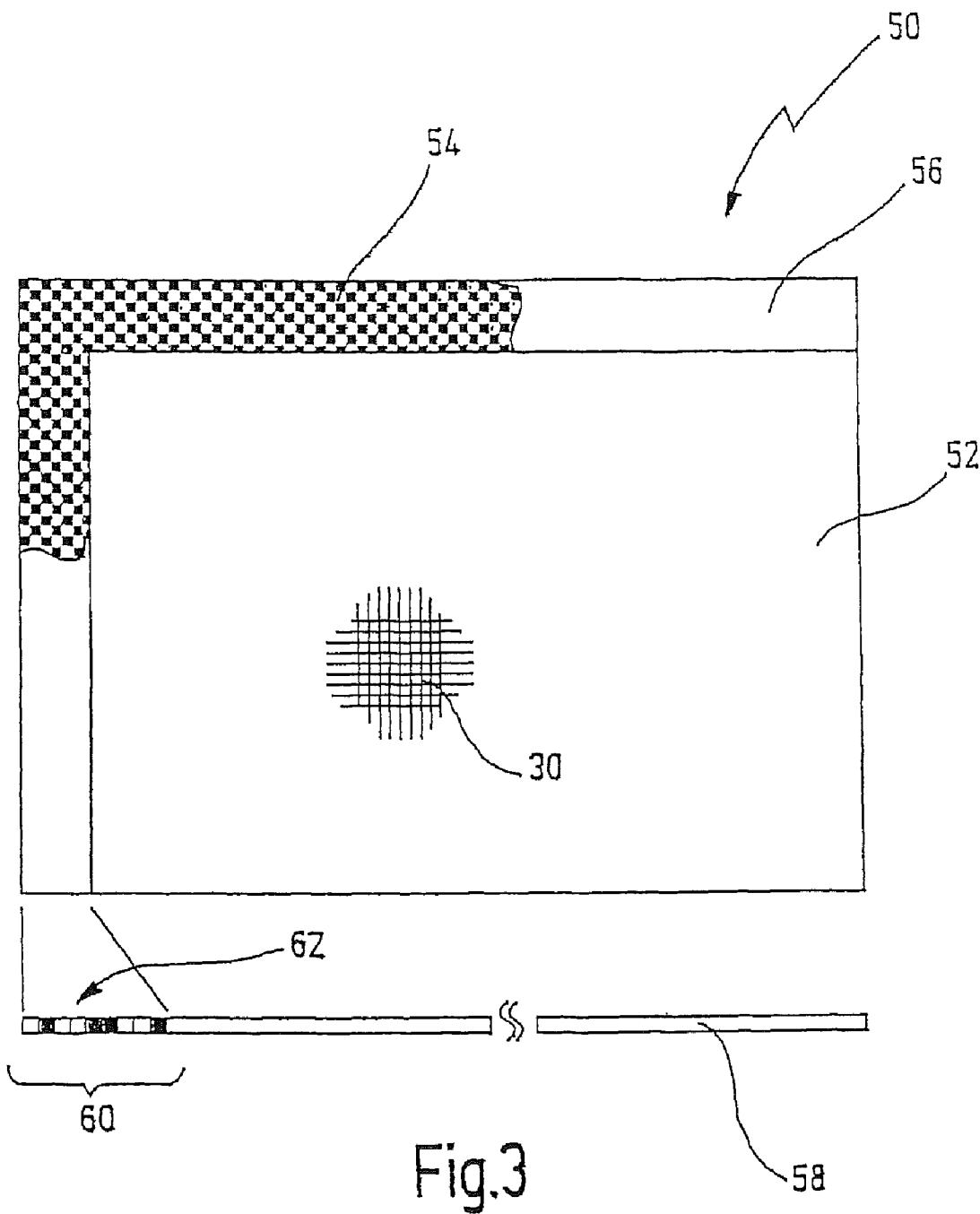
FIG. 3 shows a simplified illustration of an image sensor based on another exemplary embodiment of the invention.

In FIG. 3, an embodiment of a preferred image sensor is denoted in its entirety by reference numeral 50. The image sensor 50 has an image cell area 52 with a plurality of light-sensitive image cells 30. In a preferred embodiment, the light-sensitive surface area has a size of 640×480 image cells, which allows an image 26 to be recorded at VGA resolution. The invention is not limited to this, however, and may likewise be applied for larger or smaller image sensors. In principle, the invention may also be applied for what are known as row sensors, whose light-sensitive surface area contains just one row with a plurality of image cells. In preferred embodiments, however, the image sensor 50 is a two-dimensional image sensor with a matrix-like arrangement of the image cells 30.

At its left-hand and top edges, the image sensor 50 has a memory cell area 54 with a plurality of memory cells. In this exemplary embodiment, the memory cell area 54 is covered by an opaque layer 56, so that the content of the memory cells is independent of the incidence of light. By contrast, the image cell area 52 is "open" in a manner which is known per se, i.e. it is in this case possible for incident light to illuminate the image cells 30. For the purposes of illustration, the layer 56 in FIG. 3 is shown partly cut away in order to show the memory cells situated beneath.

Below the image sensor 50, FIG. 3 shows a single row 58 in enlarged form. In the left-hand area, the row 58 has nine memory cells 60 whose respective signal values are firmly prescribed. The signal values in the individual memory cells 60 form an identification code which is assigned to the image cells 30 in the row 58. In the same way, the memory cells arranged above the image cell area 52 form an identification code which identifies the image cells 30 in columns. In simpler embodiments of the invention, however, it is sufficient to identify the image cells 30 in rows or in columns.

In the simplest case, the identification code 62 is a dual code indicating the respective row number (or column number). In preferred embodiments, however, a error detecting code is used, such as a Hamming code, a 2-out-of-5 code or a walking code. In addition, the identification code 62 may be protected by a CRC or the like in a manner which is known per se.

In a further embodiment, the memory cells are "normal" image cells which are "loaded" with the identification codes. This can be done using a supply current or a supply voltage, for example, which induce charges in the image cells (preferably up to saturation, i.e. on the basis of a maximum illumination) or drain charges as quickly as possible. In a further exemplary embodiment, at least some of the "normal" image cells have a first and a second mode of operation. In the first mode of operation, they operate as "normal" image cells. In the second mode of operation, they operate as memory cells within the meaning of the present invention. The switch is preferably effected externally by applying a suitable signal which actuates a transistor, for example, which turns the supply or discharge current on or off. This embodiment has the advantage that the usable image surface of the image sensor can be increased in size if the identification codes are not needed, which is the case when function tests do not need to be performed permanently but rather just cyclically, for example.

What is claimed is:

1. A camera device for recording an image, comprising an image sensor having a plurality of light-sensitive image cells for generating light-dependant image signal values, the image cells being arranged in a plurality of rows and adapted to be selectively addressed in order to read the image signal values to record an image, further comprising a plurality of memory cells for storing identification codes including a unique row identification code for each of said plurality of rows, with each image cell having assigned an identification code that includes the unique row identification code for its associated row, and with the image cells and the memory cells being coupled to one another such that, when an image signal value is read from an image cell, the assigned identification code can also be read.

2. The camera device of claim 1, further comprising an addressing unit configured to jointly address the memory cells and image cells assigned to one another when reading said image signal values.

3. The camera device of claim 1, wherein the image cells and the memory cells are integrated into the image sensor.

4. The camera device of claim 1, wherein the memory cells are substantially implemented in the form of image cells, but are configured to provide a light-independent signal value.

5. The camera device of claim 1, wherein the identification code for each image cell arranged in one of said plurality of rows corresponds to the unique row identification code for said one row.

6. The camera device of claim 5, wherein the image cells are further arranged in a plurality of columns, with each column having assigned a unique column identification code.

7. The camera device of claim 6, wherein the identification code assigned to each image cell further includes the unique column identification code for its associated column.

8. The camera device of claim 1, wherein the image cells are arranged in a plurality of rows, with each row comprising a plurality of image cells.

9. The camera device of claim 8, wherein the image cells form an image cell area on the image sensor and the memory cells are interposed between the image cells forming the image cell area.

10. The camera device of claim 1, wherein the image cells form an image cell area on the image sensor and the memory cells form a memory cell area adjoining the image cell area.

11. The camera device of claim 1, further comprising a control unit connected to the memory cells and designed to change the identification codes stored in the memory cells after the image signal values are read.

12. The camera device of claim 11, wherein the control unit is designed to change the identification codes stored in the memory cells in accordance with a predetermined algorithm each time the image signal values are read.

13. The camera device of claim 1, wherein the identification codes are stored in the memory cells in the form of error detecting codes.

14. A solid-state image sensor for recording an image, comprising a plurality of light-sensitive image cells for generating light-dependant image signal values, the image cells being arranged in a plurality of rows and adapted to be selectively addressed in order to read the image signal values, and comprising a plurality of memory cells for storing identification codes including a unique row identification code for each of said plurality of rows, with each image cell having assigned an identification code that includes the unique row identification code for its associated row, and with the image cells and the memory cells being integrated on a common semiconductor chip and coupled to one another such that, when an image signal value is read from an image cell, the assigned identification code can also be read.

15. The image sensor of claim 14, wherein the memory cells are substantially implemented in the form of image cells, but are configured to provide a light-independent signal value.

16. The image sensor of claim 14, wherein the image cells are further arranged in a plurality of columns, with each column having assigned a unique column identification code.

17. The image sensor of claim 14, wherein the image cells are arranged in a plurality of rows, with each row comprising a plurality of image cells.

18. The image sensor of claim 17, wherein the image cells form an image cell area on the image sensor and the memory cells are interposed between the image cells forming the image cell area.

19. The image sensor of claim 14, wherein the image cells form an image cell area on the image sensor and the memory cells form a memory cell area adjoining the image cell area.

20. A method for recording an image with an image sensor having a plurality of light-sensitive image cells arranged in a plurality of rows for generating light-dependant image signal values, wherein the image cells can be selectively addressed in order to read the image signal values, comprising the steps of:
  a) providing identification codes in memory cells which are coupled to the image cells, with each image cell having assigned an identification code that includes a unique row identification code for its associated row,
  b) reading the image signal values from the plurality of image cells,
  c) reading the identification codes assigned to the plurality of image cells,
  d) checking whether the read identification codes match the identification codes assigned to the plurality of image cells, and
  e) exploiting the image signal values read from the plurality of image cells depending on the result of step d).

21. The method of claim 20, wherein the image signal values read are exploited for safeguarding a hazardous area of an automatically operated installation.

* * * * *